May 9, 1961  J. E. BIGELOW ET AL  2,983,819
RADIATION GAUGE
Filed June 5, 1958

INVENTORS:—
JOHN E. BIGELOW
ROBERT A. ARRISON, JR.
STANLEY BERNSTEIN
BY:—
*Junius F. Cook, Jr.*
ATTORNEY United States Patent Office 2,983,819
Patented May 9, 1961

2,983,819

RADIATION GAUGE

John E. Bigelow, Hales Corners, Wis., Robert A. Arrison, Jr., Wellesley Hills, Mass., and Stanley Bernstein, Milwaukee, Wis., assignors to General Electric Company, a corporation of New York Filed June 5, 1958, Ser. No. 740,086

16 Claims. (Cl. 250—83.6)

The present invention relates in general to the detection and measurement of penetrating rays, such as X-rays, and has more particular reference to radiation gauging systems designed to measure the density or thickness of a test object.

In gauging the density or thickness of materials by the absorption therein of penetrating rays, it is necessary to know not only the quantity of radiation incident upon the specimen and the amount of radiation delivered therethrough, but also the penetrating qualities of the radiation. Where penetrating rays from an isotope source are employed, it may be assumed that the quantity of rays applied upon the specimen and the penetrating qualities thereof will remain constant. Under such conditions, the density or thickness of the specimen can be determined simply by measuring the amount of radiation which passes through the specimen. Where the ray source, however, comprises an X-ray generating tube, the quantity and the quality of incident rays may not be assumed to be constant, since the quality and quantity of penetrating rays emitted from a ray generating tube may vary considerably in response to variable conditions under which the tube is operated, including the anode-cathode voltage at which the tube is actuated, as well as the level at which its cathode is excited for electron emission, the penetrating quality and quantity of emitted rays being non-linear functions of such variable tube operating conditions.

Under the circumstances, in order to ascertain the unknown density or thickness of a test specimen, it is necessary to derive three known quantities. In some X-ray gauging systems of high stability, the density or thickness of a test specimen is determined by measuring the intensity of rays delivered from the ray source through the test specimen and through a reference specimen of known thickness or density. In such an arrangement the three derived quantities are the thickness of the reference specimen and the measured intensities of rays passing the test and reference specimens. Such gauging systems employ wedges of known density as reference samples and require servo-mechanism for shiftably adjusting the wedges in the ray beam, and furthermore must necessarily utilize carefully and precisely made wedges.

An important object of the present invention is to provide a density or thickness gauge embodying a plurality of radiation detectors, such as ion chambers, including a pair of detectors disposed to measure ray intensity before and after passing through a test specimen, the detectors being interconnected in such fashion as to provide a signal for regulating the ray source so that the output of either of the detectors may be made precisely proportional to the density or thickness of the test object, thereby eliminating the necessity of employing precisely made wedges and expensive wedge adjusting means at the measuring station.

Briefly stated, the present invention provides means for stabilizing against the two variables of an X-ray source, namely, the quantity or intensity of emitted rays and the penetrating quality of the radiation, without recourse to moving parts such as servo driven adjustable reference wedges, the same being accomplished by providing a pair of detectors in position to measure radiation intensity prior to and after passing through a test sample, and means for comparing the outputs of the detectors to obtain a signal representing the penetrating quality of the rays and to apply such signal to control the anode-cathode voltage of the ray generating tube. Devices embodying the invention also include suitable means for controlling cathode excitation of the ray generating tube in order to establish the desired quantity of emitted rays, such control means, in one embodiment, comprising a detector positioned to measure the intensity of rays after the same have passed through a fixed absorber of known thickness or density. A modified device embodying the invention measures the current flowing in the tube in order to provide a signal corresponding with the quantity of emitted rays, means being provided for applying such signal to regulate the excitation of the cathode of the ray generating tube.

The foregoing and numerous other important objects, advantages and inherent functions of the invention will become apparent as the same is more fully understood from the following description, which, taken in connection with the accompanying drawings, discloses preferred embodiments of the invention.

Referring to the drawings.

Figure 1:
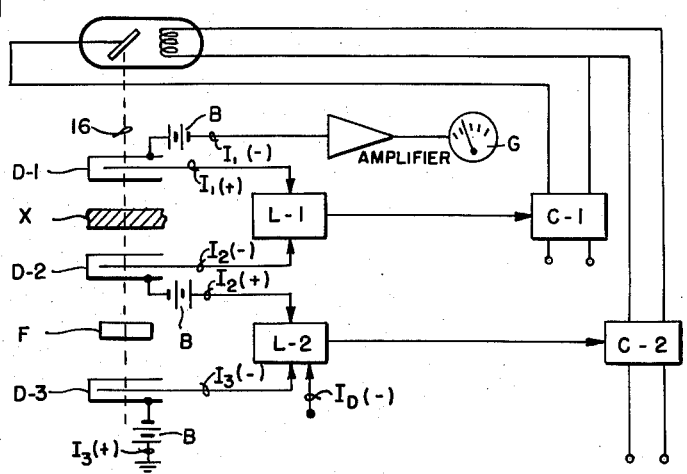
Figure 1 is a diagrammatic showing of a gauging system embodying the present invention.

To illustrate the invention the drawings show gauging systems 11 adapted for gauging the thickness or density of a test object, said systems each embodying a radiation source, such as an X-ray tube 12 having a ray generating anode 13 and a cooperating electron emitting cathode 14 enclosed in a sealed and evacuated envelope 15, said ray source serving to emit a penetrating ray beam 16 from the anode in a direction outwardly of the envelope.

Gauging systems embodying the present invention utilize a pair of detectors, one in front of and the other behind the test object, the front detector thus receiving radiation directly from the source and having less sensitivity than the other detector, which receives rays after the same have passed through the test object. The radiation response signals of the detectors are delivered upon a subtraction network adapted to control the anode-cathode voltage applied upon the tube, which is adjusted until the signals applied to the subtraction network become equalized, thereby holding at a constant value the ratio of beam intensity before and after passing through the test object, such ratio being a measure of the penetrating quality of the beam. As a consequence, as the thickness of the test object increases, the applied voltage must likewise increase in proportion, in order to maintain a constant ratio of beam intensity before and after passing through the test object. Means is also provided for adjusting cathode excitation in order that tube output will result in not only the constant ratio of intensity but in an absolute magnitude which is directly proportional to thickness of the test object. The output of either detector may be connected to a meter, preferably through a suitable amplifier, in order to show thickness or density of the test object.

In the embodiment shown in Fig. 1, the ray beam is passed in succession through a first detector D-1, a test object X of unknown thickness or density, a second detector D-2, a ray absorbing member F selected to absorb a fixed amount or proportion of the rays passing therethrough, and a third detector D-3, said detectors preferably comprising conventional ion chambers.

The detectors D-2 and D-3 are preferably of identical sensitivity, while the detector D-1 is of lesser sensitivity by a selected factor K. The detectors D-1 and D-2 are connected to regulate the penetrating quality of rays emitted by the tube 12. To this end, the detectors are arranged to deliver output current $I_1$ and $I_2$ of opposite sign at a summing circuit L-1. This is accomplished by connecting polarizing batteries B with the detectors. As a consequence, the currents delivered by the detectors D-1 and D-2 tend to cancel each other in the summing circut L-1, the difference, if any, forming a control signal which is applied on a control network C-1 connected in the anode-cathode power supply line of the tube 12. Accordingly, the operating voltage applied on the X-ray tube will always be such as to maintain ray intensity at the detector D-1 at a value that is a multiple of ray intensity at the detector D-2, such multiple being determined by the factor K, representing the sensitivity ratio of the detectors D-1 and D-2.

The detectors D-2 and D-3 may be employed to regulate the absolute level of X-ray intensity, as delivered by the ray source, so that the output of one of the detectors will bear a relation to the thickness of density of the test object X. This may be accomplished by regulating the intensity of tube emitted rays so as to hold a fixed difference in the intensity levels as measured by the detectors D-2 and D-3, on opposite sides of the fixed absorber element F, which makes the ray intensity at the detector D-3 less than the intensity at the detector D-2. In this connection, it is obvious that, if the output of the generating tube were to double with constant voltage applied between the anode and cathode of the tube, as by changing the excitation of the cathode of the tube, then the difference in currents $I_2$ and $I_3$ delivered respectively from the detector D-2 and the detector D-3 would likewise be doubled. If a difference current $I_D$ be added at the summing point L-2, a signal will be provided for the control of cathode excitation of the ray generating tube, such signal being applied through a very high gain control network C-2. As a consequence, cathode excitation of the ray generating tube may be accomplished over a wide range with very little change in input, and the sum of the three currents $I_2$, $I_3$ and $I_D$ at the summing point L-2 will actually be very close to a true null. Accordingly, the algebraic sum of the difference current $I_D$ and of the output current from detector D-3 will be substantially equal to the output current from detector D-2. The arrangement thus operates to hold constant this current difference through control of cathode excitation of the ray generating tube. The difference current $I_D$, of course, may be adjusted in order to obtain a desired ray intensity.

The fixed absorber F should be a relatively thin plate so that the change in ion chamber current per unit thickness is approximately a constant value, that is to say, where there is but a small difference in the currents delivered from the detectors D-2 and D-3, due to the small amount of absorption by the thin fixed absorber F of thickness F, and this current difference is held constant, the radiation which reaches the detector D-2 is such that the change in current with change in thickness is a fixed quantity. As a consequence, the electrical output of the detector D-2 is proportional to the thickness of the test object X and can be taken as a measure of such thickness. Since the current delivered by the detector D-1 is equal to that from detector D-2, a thickness indicating meter G may be connected to measure the current delivered by the detector D-1.

That the response of the system provides a linear relation between the density or thickness of the test object X and the output current of either of the detectors D-1 or D-2, is indicated by the following equations:

In the general case, where $I_0$ is the output current of a detector exposed to direct rays from a source such as an X-ray tube, while I is the output current of an identical detector exposed to rays delivered from the source through an absorber of thickness T and absorption coefficient $\mu$, then (1) $$I = I_0 e^{-\mu T}$$

(2) $$I \cong I_0(1 - \mu T)$$

where $\mu T$ approaches 0.

(3) $$\frac{dI}{dT} \cong \frac{\Delta I}{\Delta T} = -\mu I_0$$

by differentiation.

In the Fig. 1 embodiment, (4) $$I_2/I_1 = \frac{e^{-\mu X}}{K} = 1$$

because $I_1 - I_2 = 0$ by feed back.

(5) $$X = -\frac{\log_e K}{\mu}$$

(6) $$I_2 - I_3 = I_D$$

a constant, because $I_2 - I_3 - I_D = 0$ by feed back.

(7) $$\frac{I_3 - I_2}{F} = -\mu I_2$$

as Equation 3 applies since F is thin.

(8) $$\mu = \frac{I_D}{I_2 F}$$

by substituting (6) in (7) and solving for $\mu$.

(9) $$X = \frac{(-\log_e K)F}{I_D} I_2$$

by substituting (8) in (5).

Thus $I_2$ and also $I_1$ are linear functions of X.

Figure 2:
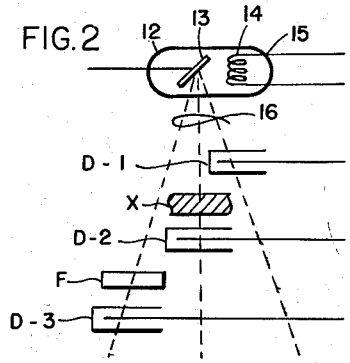
Fig. 2 illustrates a modified arrangement of the equipment shown in Fig. 1.

As indicated in Fig. 2, the detectors D-1, D-2 and D-3 may be disposed in position so that the first detector, as in the Fig. 1 embodiment, receives incident rays directly from the ray source, the second and third detectors being exposed respectively only to rays which penetrate the test object X and to rays which penetrate the fixed absorber F, the gauging system otherwise being precisely as shown in Fig. 1. The modified system shown in Fig. 2 operates in the same way as the system of Fig. 1, since there is no functional difference in the employment of detectors D-1 and D-2, and the difference between outputs of D-1 and D-3 may be used instead of that between D-2 and D-3 of Fig. 1 since the radiation intensity is simply K times as large.

During the development of the present invention, it was discovered that, under normal conditions, cathode excitation of the ray generating tube remains substantially constant and that a gauging system embodying only the first and second detectors, D-1 and D-2, may be employed to provide a gauge of ultimate simplicity for the accurate measurement of density or thickness of a test object. Accordingly, as shown more especially in Fig. 3 of the drawings, the gauging system of the present invention may be simplified by eliminating the third detector D-3 and the fixed absorber F, the functions of such eliminated components being essentially performed by a regulator C-2 which serves to control cathode excitation of the beam generating tube in response to fluctuations in anode-cathode current flowing in the tube, the same being a function of the intensity of the emitted ray beam. It will be seen that the principal difference between the systems shown in Fig. 3 and the systems shown in Figs. 1 and 2 resides in the means for and method of obtaining a control signal for regulating cathode excitation in the beam generating tube.

Figure 3:
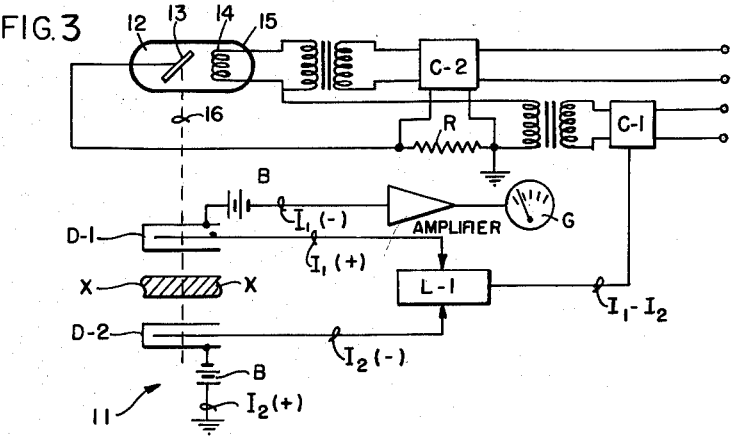
Fig. 3 is a diagrammatic showing of a modified gauging system embodying the invention.

This is accomplished, in the two detector system of Fig. 3, by measuring the anode-cathode current in the beam generating tube, as by measuring the potential developed across a resistor R disposed in the anode-cathode energizing circuit of the tube and by comparing such voltage with a suitable reference voltage which may be built into the cathode excitation regulator C-2. The remaining parts of the two detector system shown in Fig. 3 may be identical with the corresponding portions of the three detector system. The three variables which were measured in the three detector system are also measured in the two detector system. In the two detector system, however, instead of measuring the attenuation of the beams through a fixed absorber F, which may be considered as corresponding with the current in the X-ray tube, the system shown in Fig. 3 simply measures the anode-cathode current of the tube itself and applies the same to control cathode excitation. The two detector system thus deals with the same three measurements and two controllers C-1 and C-2 and one read out meter G as are employed in the three detector system.

It is thought that the invention and its numerous attendant advantages will be fully understood from the foregoing description, and it is obvious that numerous changes may be made in the form, construction, and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A penetrating ray gauging system comprising the combination, with an X-ray tube having an anode and a cathode excitable for electron emission at a variable rate, of a pair of primary ray detectors disposed respectively in position to receive tube emitted rays before and after traversing a test object and to produce corresponding detector response signals, means for comparing said detector response signals to produce a control signal corresponding to the difference in magnitude of said detector signals, means to apply operating power on said tube at voltage varying in accordance with said control signal, and means to measure the value of one of said detector signals.

2. A penetrating ray gauging system as set forth in claim 1, including means to regulate cathode excitation in accordance with absolute beam intensity.

3. A penetrating ray gauging system as set forth in claim 1, including means to regulate cathode excitation in accordance with variations in anode-cathode tube current.

4. A penetrating ray gauging system as set forth in claim 1, including means to continuously produce a secondary control signal corresponding with anode-cathode current in said tube, and means to regulate cathode excitation in accordance with said secondary control signal.

5. A penetrating ray gauging system as set forth in claim 1, including a secondary ray detector positioned to receive tube emitted rays through a fixed absorber and to produce a corresponding response signal, means to derive a secondary control signal from the response signals of said secondary and one of said primary detectors, and means to regulate cathode excitation in accordance with said secondary control signal.

6. A penetrating ray gauging system comprising the combination, with an X-ray tube having an anode and a cathode excitable for electron emission at a variable rate, of a pair of primary ray detectors disposed respectively in position to receive rays delivered directly from the tube and indirectly through a test object, means to apply response signals delivered by said detectors in opposition at a summing station to produce a control signal, means for delivering operating power on said tube at voltage varying in accordance with said control signal, means to regulate electron emission at said cathode in accordance with variations in the anode-cathode current of the tube, and means to measure the response of one of said detectors.

7. A penetrating ray gauging system comprising the combination, with an X-ray tube having an anode and a cathode excitable for electron emission at a variable rate, of a pair of primary ray detectors disposed respectively in position to receive rays delivered directly from the tube and indirectly through a test object, means to apply response signals delivered by said detectors in opposition at a summing station to produce a control signal, means for delivering operating power on said tube at voltage varying in accordance with said control signal, and means to regulate electron emission at said cathode in accordance with the absolute penetrating quality of the beam.

8. A penetrating ray gauging system comprising the combination, with an X-ray tube having an anode and a cathode excitable for electron emission at a variable rate, of a pair of primary ray detectors disposed respectively in position to receive rays delivered directly from the tube and indirectly through a test object, means to apply response signals delivered by said detectors in opposition at a summing station to produce a control signal, means for delivering operating power on said tube at voltage varying in accordance with said control signal, a secondary ray detector positioned to receive rays from the tube through a standard comparison piece, means to apply signals delivered by said secondary and one of the primary detectors in opposition at a summing station to produce a secondary control signal, means to regulate the excitation of the cathode in accordance with the secondary control signal, and means to measure the response of one of said detectors.

9. A penetrating ray gauging system comprising the combination, with an X-ray tube having an anode and a cathode excitable for electron emission at a variable rate, of a pair of primary ray detectors disposed respectively in position to receive rays delivered directly from the tube and indirectly through a test object, means to apply response signals delivered by said detectors in opposition at a summing station to produce a control signal, means for delivering operating power on said tube at voltage varying in accordance with said control signal, means to continuously produce a secondary control signal corresponding with the anode-cathode current flow in the tube, means to vary the cathode excitation of the tube in accordance with said secondary control signal, and means to measure the response of one of said detectors.

10. A gauging device comprising: a source of penetrating ray energy; a test object whose thickness is to be determined; a first detector located between said source and said object; a second detector located with said object between it and said first detector; and means for comparing the output signals from said detectors to produce a difference signal proportional to the difference in magnitudes of said output signals from said detectors.

11. A gauging device as recited in claim 10 wherein said first detector is less sensitive than said second detector.

12. A gauging device comprising: a source of ray energy having means included therein for varying the intensity and penetrating quality of said ray energy generated by said source; a test object to be gauged disposed in the path of said ray energy; first and second detectors for detecting said ray energy and producing output response quantities proportional to the magnitudes of the energy detected, said first detector being located on the opposite side of said object from said second detector with both said detectors in the path of said ray energy; means for comparing said response quantities and for producing a control quantity proportional to the difference between said response quantities, said control quantity being coupled to one of said ray energy varying means included in said source.

13. A gauging device as recited in claim 12 including means for displaying the response quantity of the detector located closer to said source.

14. A gauging device as recited in claim 12 wherein the sensitivity of the detector located closer to said source is less than that of said other detector by a known factor.

15. A gauging device as recited in claim 12 including a third detector located farther from said source than said first and second detector; a ray energy absorbing element having a known absorption characteristic located between said third detector and said source in the path of said ray energy.

16. A gauging device as recited in claim 15 including means for combining the output response quantity from said third detector with an output response from one of said first and second detectors and for applying the combined quantity to one of said ray energy varying means.

References Cited in the file of this patent

UNITED STATES PATENTS

| | | |
|---|---|---|
| 2,467,812 | Clapp | Apr. 19, 1949 |
| 2,503,075 | Smith | Apr. 4, 1950 |
| 2,537,914 | Rcop | Jan. 9, 1951 |
| 2,825,816 | Rogers | Mar. 4, 1958 |